United States Patent
Lin et al.

(10) Patent No.: US 8,581,974 B2
(45) Date of Patent: Nov. 12, 2013

(54) SYSTEMS AND METHODS FOR PRESENCE DETECTION

(75) Inventors: Sheng Lin, San Jose, CA (US); David Pope, Fremont, CA (US)

(73) Assignee: Aptina Imaging Corporation, Georgetown (KY)

( * ) Notice: Subject to any disclaimer, the term of this patent is extended or adjusted under 35 U.S.C. 154(b) by 407 days.

(21) Appl. No.: 12/775,139

(22) Filed: May 6, 2010

(65) Prior Publication Data

US 2011/0273546 A1 Nov. 10, 2011

(51) Int. Cl.
*H04N 7/18* (2006.01)

(52) U.S. Cl.
USPC ............... 348/94; 348/61; 348/152; 348/154

(58) Field of Classification Search
USPC ...................... 348/61, 94, 152, 154
See application file for complete search history.

(56) References Cited

U.S. PATENT DOCUMENTS

| | | | | |
|---|---|---|---|---|
| 7,912,282 | B2* | 3/2011 | Nakamura | 382/167 |
| 2005/0289363 | A1* | 12/2005 | Tsirkel et al. | 713/300 |
| 2006/0192775 | A1* | 8/2006 | Nicholson et al. | 345/211 |
| 2008/0290173 | A1* | 11/2008 | Kotlarsky et al. | 235/462.42 |
| 2009/0251544 | A1* | 10/2009 | Martin et al. | 348/155 |
| 2010/0315523 | A1* | 12/2010 | Kirsch et al. | 348/222.1 |
| 2011/0103643 | A1* | 5/2011 | Salsman et al. | 382/103 |
| 2012/0018637 | A1* | 1/2012 | Mitani | 250/339.02 |

* cited by examiner

*Primary Examiner* — Phuoc Nguyen
(74) *Attorney, Agent, or Firm* — Kramer Levin Naftalis & Frankel LLP

(57) ABSTRACT

Systems and methods are provided for presence detection using an image system. The image system may be a camera that is integrated into an electronic device. In some embodiments, the image system can accommodate multiple operating modes of the electronic device. For example, when the electronic device is operating in a normal power mode, control circuitry of the image system can detect when a user has left and is no longer using the electronic device. When the electronic device is operating in a power saving mode, the control circuitry can detect user presence (e.g., when a user has come back to the electronic device). In some embodiments, the control circuitry can adjust for both gradual and sudden light changes.

18 Claims, 6 Drawing Sheets

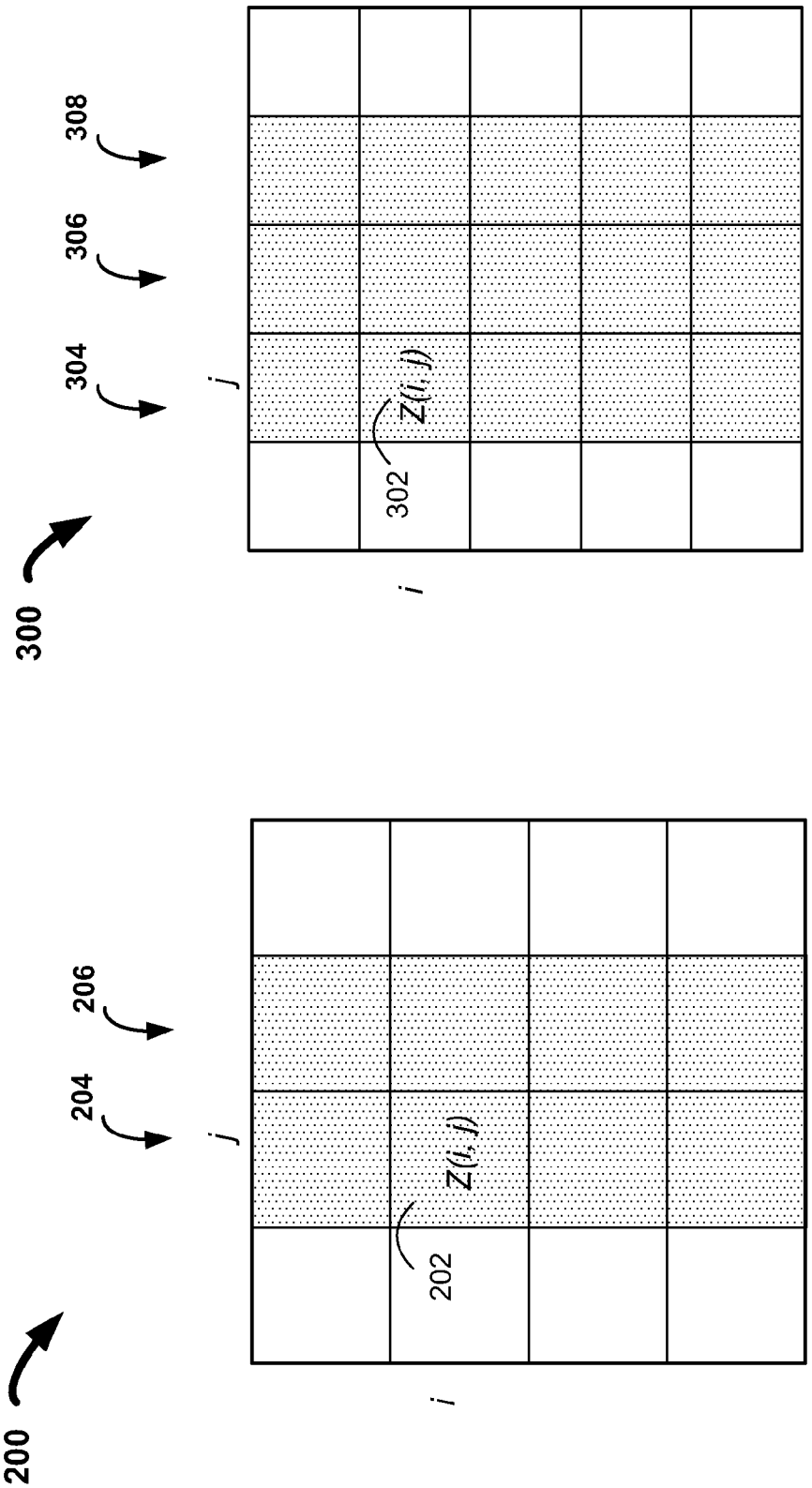

SYSTEMS AND METHODS FOR PRESENCE DETECTION

FIELD OF THE INVENTION

This is directed to systems and methods for presence detection using an image system.

BACKGROUND OF THE DISCLOSURE

Modern electronic devices generally include a battery that allows the devices to operate without being connected to an external power source. In order to conserve power and extend the length of time that a battery can last without recharging, some devices can go into various power saving modes when there has been no user activity for a period of time. A device can go into a power saving mode by, for instance, turning off a display, turning off one or more hard disks, entering system standby, and/or entering system hibernation.

Additionally, when an electronic device is operating in a power saving mode, a user generally needs to perform one or more actions in order to wake up the electronic device. For example, depending on which power mode the electronic device is currently operating in, a user generally needs to wake up the device by pressing a key on a keyboard, tapping a touch pad, pressing a mouse button, or pressing a power button.

BRIEF DESCRIPTION OF THE DRAWINGS

FIG. 2 illustrates an image frame with multiple zones in accordance with embodiments of the invention.

FIG. 3 illustrates another illustrative image frame with multiple zones in accordance with embodiments of the invention.

DETAILED DESCRIPTION OF THE DISCLOSURE

Modern electronic devices offer a wide variety of capabilities. Some electronic devices can include an image system (e.g., a camera) capable of capturing images or video.

Figure 1:
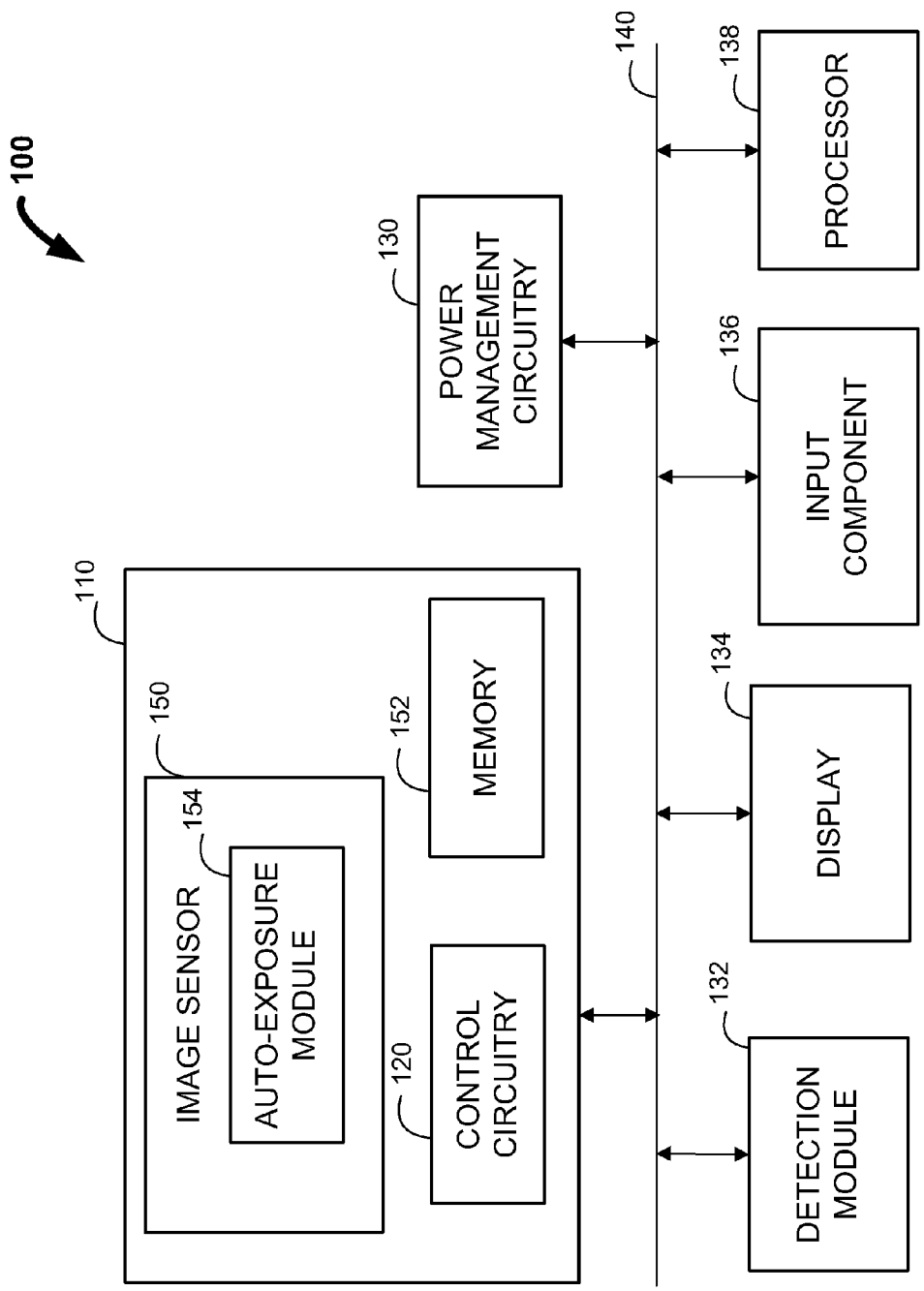
FIG. 1 is a schematic view of an illustrative electronic device configured in accordance with embodiments of the invention.

FIG. 1 is a schematic view of an illustrative electronic device 100 configured in accordance with embodiments of the invention. Electronic device 100 can be any type of user device that utilizes an image system (embodied here as image system 110) and is controlled generally by control circuitry 120. For example, image system 110 can include a camera, such as a computer camera (e.g., a webcam), still camera, or video camera that may be integrated into electronic device 100.

Electronic device 100 can include any suitable electronic device or system. For example, electronic device 100 can include a desktop computer, a laptop computer, a portable media player, a cellular telephone, a personal digital assistant, and/or any combination thereof. Electronic device 100 and/or image system 110 can also include any other components in a typical camera or electronic device. For the sake of simplicity, however, these components are not depicted in FIG. 1 to avoid any distractions from embodiments of the invention.

Components of electronic device 100 (e.g., image system 110, power management circuitry 130, detection module 132, display 134, input component 136, and processor 138) can communicate with one another via bus 140. For example, one or more signals (e.g., data signals and/or control signals) can be transmitted over bus 140 between image system 110 and any other component of electronic device 100.

In some embodiments, electronic device 100 can include power management circuitry 130, detection module 132, display 134, input component 136, and processor 138. Power management circuitry 130 can include any suitable circuitry (e.g., a power supply and/or a battery) for providing power to one or more components of electronic device 100. In some cases, one or more control lines can connect image system 110 to power management circuitry 130. Depending on the states of the one or more of the control lines, power management circuitry 130 can either be enabled to wake up processor 138 or trigger processor 138 to enter a power saving mode (e.g., an off, sleep, hibernate, or standby mode).

Detection module 132 can include any suitable components capable of detecting the presence of one or more users of electronic device 100. Detection module 132 can include, for example, one or more face detectors, voice detectors, heat detectors, fingerprint detectors, any other suitable biometric detector, and/or any combination thereof. In some embodiments, detection module 132 can be activated or deactivated based on one or more signals received from image system 110 via bus 140.

Display 134 and input component 136 can provide a user interface for a user to interact with electronic device 100. In some embodiments, display 134 can represent visual media (e.g., graphics such as videos, photographs, and text) to a user. Display 134 can include, for example, a liquid crystal display ("LCD"), a light emitting diode ("LED") display, a touch screen display, or any other type of display. Input component 136 can enable a user to interact with electronic device 100. Input component 136 can include, for example, a button, a keyboard, a mouse, and/or any other suitable input device.

In some embodiments, processor 138 can detect if there is any user activity by monitoring input component 136 for a pre-determined period of time (e.g., 20 minutes). If processor 138 detects that there is no user activity for the pre-determined period of time, processor 138 can enter a power saving mode. For example, in order to conserve power, processor 138 can turn off display 134, turn off one or more hard drives (not shown), enter system standby, and/or enter system hibernation.

Image system 110 can include control circuitry 120, image sensor 150, and memory 152. Image sensor 150 can capture data (e.g., pixels) corresponding to an image. An "image" hereinafter refers to a streaming image that can be captured in the frame of a camera.

Image sensor 150 can calculate any suitable statistical or parametric data corresponding to an image including, for example, auto-exposure data, auto-white balance data, auto-focus data, and/or any combination thereof. For example, image sensor 150 may include auto-exposure module 154 for adjusting the exposure of an image and/or calculating one or more luminance values of an image. In some embodiments, auto-exposure module 154 can adjust the exposure of an image in response to detecting a change in the luminance values of one or more portions (e.g., zones) of the image. The change in the luminance values may be caused by one or more factors such as, for example, when a person walks by image system 110 and electronic device 100, when the lighting condition changes (e.g., a light is turned on or off), any other suitable factors, and/or any combination thereof.

Image sensor 150 and control circuitry 120 may be implemented using any suitable combination of hardware and software. In some embodiments, image sensor 150 can be implemented substantially all in hardware. For example, image sensor 150 may be implemented as a system-on-a-chip (SoC). This way, image sensor 150 can have a small design occupying a minimum area. In addition, image sensor 150 may have circuit components designed to maximize the speed of operation. Control circuitry 120 may include, for example, one or more processors, microprocessors, ASICS, FPGAs, or any suitable combination of hardware and software.

Memory 152 may include one or more memory modules for storing information for image system 110, such as cache memory, Flash memory, random access memory (RAM) (e.g., DDR RAM and/or SRAM), read only memory (ROM), a hard drive, an EPROM, EEPROM, or any combination thereof. For example, memory 152 may be used by control circuitry 120 to store one or more images and/or any suitable data associated with the one or more images. Memory 152 can, for instance, store any parameters calculated by control circuitry 120 and/or image sensor 150. In some cases, memory 152 can also be used for storing information for electronic device 100.

In some embodiments, image sensor 150 can calculate a set of luminance values for an image. For example, image sensor 150 can first divide an image into multiple zones. Then, for each zone of the image, image sensor 150 can compute an average luminance value. Thus, image sensor 150 can produce a set of luminance values for the entire image. After calculating the set of luminance values, control circuitry 120 can store the set of luminance values in memory 152.

Turning now to FIG. 2, an illustrative image frame 200 with multiple zones is shown in accordance with embodiments of the invention. As shown in FIG. 2, image frame 200 can include a 4×4 grid of zones. An image sensor (e.g., image sensor 150 of FIG. 1) can therefore calculate an average luminance value for each zone in the grid of zones. For instance, $Z(i, j)$ can represent an average luminance of zone 202 at a particular location $(i, j)$. Thus, for a 4×4 grid of zones, the image sensor can calculate 16 luminance values.

Turning next to FIG. 3, an illustrative image frame 300 with multiple zones is shown in accordance with embodiments of the invention. As shown in FIG. 3, image frame 300 can include a 5×5 grid of zones. An image sensor (e.g., image sensor 150 of FIG. 1) can therefore calculate an average luminance value for each zone in the grid of zones. For instance, $Z(i, j)$ can represent the average luminance of zone 302 at a particular location $(i, j)$. Thus, for a 5×5 grid of zones, the image sensor can calculate 25 luminance values.

Although image frame 200 (FIG. 2) and image frame 300 (FIG. 3) correspond to 4×4 and 5×5 grid of zones, respectively, persons skilled in the art will appreciate that an image sensor can use any suitable type of partitioning to define one or more zones. For example, an image sensor can partition an image into a 30×30 grid of zones.

Control circuitry (e.g., control circuitry 120 of FIG. 1) of an image system (e.g., image system 100 of FIG. 1) can use the set of luminance values calculated by an image sensor (e.g., image sensor 150 of FIG. 1) to perform presence detection. In contrast to traditional systems that operate on individual image pixels, the control circuitry of this image system only has to operate on a limited number of luminance values. Thus, the resulting algorithm is more cost effective as compared to existing algorithms.

Presence detection using the image system can be enabled using any suitable approach. For example, a user may enable presence detection by entering an input on an input component (e.g., input component 136 of FIG. 1). As another example, a processor (e.g., processor 138 of FIG. 1) of an electronic device (e.g., electronic device 100 of FIG. 1) can automatically enable presence detection if there has not been any user activity for a period of time (e.g., no keyboard or mouse inputs for a pre-defined period of time). A processor can enable presence detection by, for example, transmitting an enable signal over a bus (e.g., bus 140 of FIG. 1).

Then, in response to receiving an enable signal, the control circuitry can calculate and monitor any suitable parameter(s) in order to perform presence detection. The parameter(s) calculated may depend on an operating mode of the electronic device and/or the image system.

In some embodiments, the operating mode of the electronic device can be a normal power mode, where the components of the electronic device are functioning at a normal power level. For example, while the electronic device is operating in a normal power mode, the control circuitry can detect when a user has left and is no longer using the electronic device. Thus, if the control circuitry fails to detect a user, the control circuitry can enable the electronic device to enter a power saving mode.

Persons skilled in the art will appreciate that the control circuitry can interact with any suitable component(s) of the electronic device during presence detection. For example, the control circuitry can communicate with power management circuitry (e.g., power management circuitry 130 of FIG. 1), a detection module (e.g., detection module 132 of FIG. 1), a display (e.g., display 134 of FIG. 1), an input component (e.g., input component 136 of FIG. 1), a processor (e.g., processor 138 of FIG. 1), any other suitable component of the electronic device, and/or any combination thereof.

In some embodiments, in response to failing to detect a user, the control circuitry can enable other actions in the electronic device. For example, in order to conserve power, the control circuitry can shorten the duration that the electronic device waits before entering the power saving mode. Normally, for instance, the electronic device may enter the power saving mode after 20 minutes of no user activity. However, after presence detection has been enabled, the control circuitry can enable the electronic device to enter the power saving mode in a shorter period of time if the control circuitry does not detect any user presence for a pre-determined period of time (e.g., 5 minutes). As another example, the control circuitry can enable the electronic device (e.g., by transmitting information to processor 138 of FIG. 1) to dim a display. For instance, the control circuitry can dim a display of the electronic device, such as display 134 of FIG. 1, by 10%. This dimming can provide a warning to a user that the electronic device will soon enter a power saving mode.

Then, after waiting for a period of time (e.g., 15 seconds), if the control circuitry still does not detect user presence, the control circuitry can enable the electronic device to enter the power saving mode. If, on the other hand, the user moves slightly (e.g., by tilting his head) after he observes the dimming of the display, the control circuitry can detect user presence and enable the electronic device to return to operating in a normal power mode. Correspondingly, the electronic device can return the display to a normal brightness level.

As yet another example, in response to failing to detect a user, the control circuitry can enable or trigger a detection module (e.g., detection module 132 of FIG. 1) to further verify whether a user is in front of the electronic device. For example, the control circuitry can trigger the electronic device (e.g., processor 138 of FIG. 1) to execute a face detection or face recognition program. The face detection or face recognition program can then verify whether a user is still sitting in front of the electronic device. As such, the triggering of the detection module can prevent the electronic device from prematurely entering a power saving mode.

In other embodiments, the operating mode of the electronic device can be a power saving mode, where one or more components of the electronic device may be in a power save state (e.g., an off, sleep, hibernate, or standby state). While the electronic device is operating in the power saving mode, the control circuitry can detect user presence (e.g., detect when a user has come back to the electronic device). In response to detecting user presence, the control circuitry can enable the electronic device to wake up automatically (e.g., enter a normal power mode) without any express actions from the user. As a result, the user does not have to physically interact with the electronic device in order for the electronic device to wake up (e.g., the user does not need to touch or press one or more input components such as input component 136 of FIG. 1).

Similar to the normal power mode, in response to detecting user presence, the control circuitry can enable other actions in the electronic device. For example, the control circuitry can enable or trigger a detection module (e.g., detection module 132 of FIG. 1) to further verify whether a user has been detected. For example, a processor (e.g., processor 138 of FIG. 1) can execute a face detection program, which can attempt to locate a user's face is in front of the electronic device. Thus, the triggering of the detection module can prevent the electronic device from prematurely entering a normal power mode. In addition, by triggering the detection module, the control circuitry can enable automatic user login. For example, the detection module can include a recognition component that, upon recognizing the user, can automatically login the user without requiring the user to enter a password.

Persons skilled in the art will appreciate that after detecting user presence, the control circuitry can enable only certain components of the electronic device to wake up. For example, the control circuitry can interact with power management circuitry to wake up only a processor (e.g., processor 138 of FIG. 1) of the electronic device and/or a detection module (e.g., detection module 132 of FIG. 1) of the electronic device. Thus, the remaining components of the electronic device can remain in a power saving mode (e.g., a display such as display 134 of FIG. 1). However, once the detection module detects a user, the electronic device can wake up the remaining components of the electronic device. As a result, one of the advantages of this system is that the detection module does not need to run constantly, which allows the electronic device to conserve power.

FIGS. 4, 5A, 5B, and 6 are flowcharts of illustrative processes that can be executed by control circuitry to achieve some of the above-described features and functionalities. In particular, the processes may be executed by control circuitry in an image system (e.g., image system 110 of FIG. 1) configured in accordance with embodiments of the invention, such as control circuitry 120 of FIG. 1. It should be understood that these processes are merely illustrative, and that any steps can be removed, modified, combined, or any steps may be added, without departing from the scope of the invention.

Figure 4:
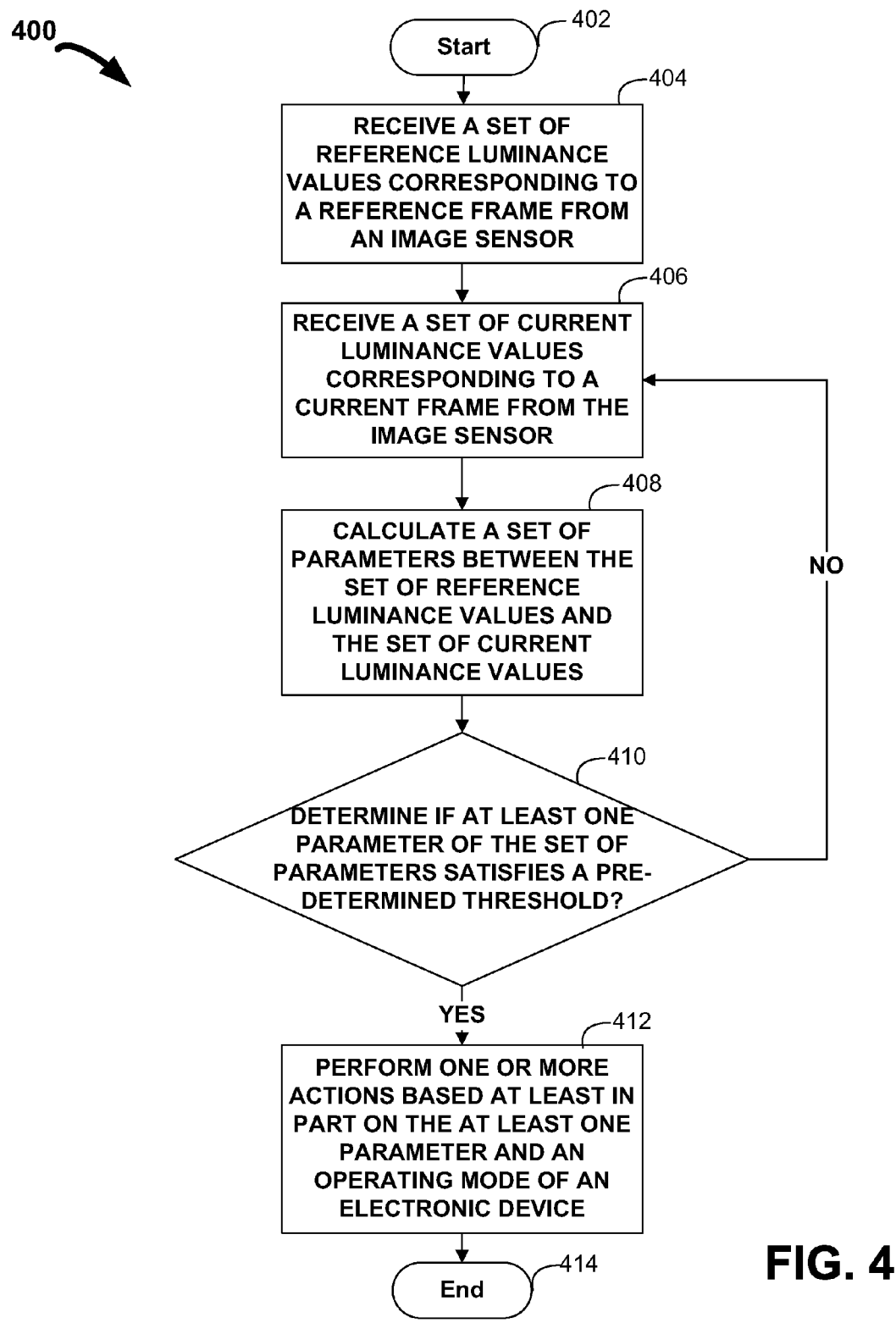
FIG. 4 is a flowchart of an illustrative process for performing presence detection in accordance with embodiments of the invention.

Referring first to FIG. 4, process 400 is shown for performing presence detection in accordance with embodiments of the invention. Process 400 begins at step 402. For example, the control circuitry may have received an enable signal to activate presence detection. The enable signal may have been received, for instance, from a processor (e.g., processor 138 of FIG. 1) of an electronic device (e.g., electronic device 100 of FIG. 1) via a bus (e.g., bus 140 of FIG. 2).

Then, at step 404, the control circuitry can receive a set of reference luminance values corresponding to a reference frame from an image sensor (e.g., image sensor 150 of FIG. 1). The reference frame can correspond to any suitable image frame captured by an image sensor of the image system. In some embodiments, the reference frame can correspond to a first image frame captured by an image sensor after presence detection is enabled. Persons skilled in the art will appreciate that the control circuitry can select any suitable frame as the reference frame.

Each reference luminance value can correspond to each zone in a grid of zones of the reference frame. For example, for a reference frame with a 4×4 grid of zones (e.g., image frame 200 of FIG. 2), the control circuitry can receive 16 luminance values. As another example, for a reference frame (e.g., image frame 300 of FIG. 3) with a 5×5 grid of zones, the control circuitry can receive 25 luminance values. In some embodiments, after receiving the set of reference luminance values, the control circuitry can store the reference luminance values in memory (e.g., memory 152 of FIG. 1).

Continuing to step 406, the control circuitry can receive a set of current luminance values corresponding to a current frame from the image sensor. For example, the current frame can correspond to a current image frame that has been captured by the image sensor. For example, for a current frame with a 4×4 grid of zones (e.g., image frame 200 of FIG. 2), the control circuitry can receive 16 luminance values. As another example, for a current frame (e.g., image frame 300 of FIG. 3) with a 5×5 grid of zones, the control circuitry can receive 25 luminance values.

At step 408, the control circuitry can calculate a set of parameters between the set of reference luminance values and the set of current luminance values. For example, for each corresponding zone in the reference frame and the current frame, the control circuitry can calculate a difference in luminance values between a current frame and a reference frame. For instance, for a zone at a location $(i, j)$, the control circuitry can calculate a difference in luminance values, $D(i,j)$, according to:

$$D(i,j)=Z_{cur}(i,j)-Z_{ref}(i,j) \quad (1),$$

where $Z_{cur}(i, j)$ can correspond to an average luminance of a zone at location $(i, j)$ in a current frame, and $Z_{ref}(i, j)$ can correspond to an average luminance of a zone at location $(i, j)$ in a reference frame.

After calculating the differences in luminance values, the control circuitry can determine whether the difference is substantial for each zone of the grid of zones. For example, for each zone, the control circuitry can determine whether the difference in luminance values is above a pre-determined threshold. In some embodiments, the control circuitry can determine whether the difference is substantial by calculating an absolute differential between a current luminance value and a reference luminance value. For instance, for a zone at a location $(i, j)$, the control circuitry can determine whether $D(i, j)$ satisfies the following criteria:

$$|D(i,j)|>\text{absolute\_luma\_threshold} \quad (2),$$

where the absolute_luma_threshold can correspond to a pre-determined threshold above which the difference in luminance values is considered significant.

In other embodiments, the control circuitry can determine whether the difference is substantial by calculating a percentage differential between a current luminance value and a reference luminance value. For instance, for a zone at a location (i, j), the control circuitry can determine whether D(i, j) satisfies the following criteria:

$$(|D(i,j)|+c)/(Z_{ref}(i,j)+c) > \text{percent\_luma\_threshold} \quad (3),$$

where c can correspond to a constant parameter, and the percent_luma_threshold can correspond to a pre-determined threshold above which the difference in luminance values is considered significant (e.g., percent_luma_threshold can have a value of 10%). In some embodiments, by using the constant parameter, c, the control circuitry can avoid division by zero when $Z_{ref}(i, j)$ is zero. In addition, the constant parameter, c, can also prevent a small D(i, j) from generating a huge percentage differential when $Z_{ref}(i, j)$ also has a small value. Finally, by selecting a low value for the constant parameter, c, the control circuitry can minimize the effect that the constant parameter has on the percentage differential when $Z_{ref}(i, j)$ has a large value. For example, the constant parameter can have a value of 5 for 8-bit zone luminance values.

After determining whether the differences in luminance values are substantial based on either Equation (2) or (3), the control circuitry can calculate one or more parameters associated with the luminance values. For example, the control circuitry can calculate a parameter, changed_zones, corresponding to the number of changed zones that have a substantial difference in luminance values (e.g., a difference in luminance values that is above a pre-determined threshold as calculated in Equation (2) or (3)). As another example, the control circuitry can calculate a parameter, changed_columns, corresponding to the number of changed columns that have at least one zone where the difference in luminance values is substantial. Alternatively or additionally, the control circuitry can calculate a parameter, changed_rows, corresponding to the number of changed rows that have at least one zone where the difference in luminance values is substantial. As yet another example, the control circuitry can calculate a parameter, positive_zones, corresponding to the number of positively changed zones that have a substantial positive change in luminance values (e.g., D(i, j)>0 and Equation (2) or (3) is satisfied). As a further example, the control circuitry can calculate a parameter, negative_zones, corresponding to the number of negatively changed zones that have a substantial negative change in luminance values (e.g., D(i, j)<0 and Equation (2) or (3) is satisfied).

Then, at step 410, the control circuitry can determine if at least one parameter of the set of parameters satisfies a pre-determined threshold. In some embodiments, the control circuitry can attempt to detect the source of any substantial change in luminance values. For example, a sudden light change (e.g., a light switch being switched on or off) can cause a substantial change in luminance values. In such a situation, almost all zones (if not all) may have a substantial change in luminance values, and almost all of the changes will be either positive or negative. In other words, one of positive_zones or negative_zones must be equal to zero. The sudden light change may be distinguished from a situation where a user has just come back to an electronic device. In a scenario where a user has just come back to the electronic device, only some of the zones will have a substantial change in luminance values. Thus, the control circuitry can determine that a substantial change in luminance values is caused by a sudden light change if the following factors are satisfied:

positive_zones=0 or negative_zones=0 \quad (4), changed_zones>=zone_threshold_high \quad (5), where zone_threshold_high can correspond to a pre-determined threshold (e.g., a high zone threshold) associated with a minimum number of changed zones where a sudden light change may be considered as the source of a substantial change in luminance values. For example, for a 4×4 grid of zones, zone_threshold_high can have a value of 13.

In some embodiments, an image system may use a rolling shutter to capture a current image frame. For such a system, only a portion of a current image frame may have been exposed to light before the sudden light change (e.g., before the light was switched on or off). Thus, the sudden light change may cause the exposure in the current image frame to be uneven. As a result of this uneven exposure, the control circuitry may determine that Equation (4) is satisfied but that Equation (5) is not satisfied. In some embodiments, if the control circuitry detects this condition, the control circuitry can ignore the results for the current image frame. Instead, the control circuitry can wait for the next image frame in order to determine whether a sudden light change has occurred (e.g., by recalculating Equations (4) and (5)).

In some embodiments, as discussed previously, an electronic device (e.g., electronic device 100 of FIG. 1) can operate in a normal power mode, where the components of the electronic device are functioning at a normal power level. Thus, while the electronic device is operating in the normal power mode, the control circuitry can detect when a user has left and is no longer using the electronic device. For example, while operating in a normal power mode, the control circuitry can detect user presence if the control circuitry determines that the number of changed zones is greater than a pre-determined threshold and that the change in luminance values is not caused by a sudden light change. For instance, the control circuitry can detect user presence in close proximity to the image system according to:

```
if ((changed_zones > zone_threshold_1) && (no_sudden_light))
    detection = 1;
else
    detection = 0;
end
``` where zone_threshold_1 can correspond to a pre-determined threshold (e.g., a first zone threshold) associated with a minimum number of changed zones for an electronic device operating in a normal power mode (e.g., zone_threshold_1 can have a value of 0), detection can correspond to a parameter indicating whether user presence has been detected (e.g., where detection=1 indicates that user presence has been detected, and detection=0 indicates that user presence has not been detected), and no_sudden_light can correspond to whether the substantial change in luminance values was determined to be caused by a sudden light change. For example, no_sudden_light may have a value of 0 if the control circuitry determines that Equations (4) and (5) are both satisfied. Alternatively, no_sudden_light may have a value of 1 if the control circuitry determines that at least one of Equations (4) and (5) has not been satisfied.

In some embodiments, in order to determine whether a user is still using the electronic device, the control circuitry can adjust one or more parameters based on the relative positioning between a user and an image system. For example, when a user is using an electronic device (e.g., a computer), the user generally sits in front or near the middle of the field of view of the image system (e.g., a camera). Thus, in determining the changed_zones parameter, the control circuitry can exclude one or more zones that are in the far left columns and one or more zones that are in the far right columns. Using such an approach, for a 4×4 grid of zones, the control circuitry can determine the changed_zones parameter based on only the zones in the middle two columns of an image frame (e.g., columns 204 and 206 of FIG. 2). Similarly, for a 5×5 grid of zones, the control circuitry can determine the changed_zones parameter based on only the zones in the middle three columns of an image frame (e.g., columns 304, 306, and 308 of FIG. 3).

In other embodiments, as discussed previously, the electronic device can operate in a power saving mode, where one or more components of the electronic device may be in a power save state (e.g., an off, sleep, hibernate, or standby state). While the electronic device is operating in the power saving mode, the control circuitry can detect user presence (e.g., when a user has come back to the electronic device) while simultaneously avoid detecting false positives. For example, a false positive may be detected if a person is walking in the background of an image frame rather than towards the image system. However, if a person is merely walking by, the control circuitry may detect multiple zones with changes in luminance values, but the control circuitry is unlikely to detect changed zones in a substantial number of columns. In contrast, if a user has come back and is sitting in front of the electronic device, the control circuitry may detect a substantial number of columns with changed zones. Thus, while operating in a power saving mode, the control circuitry can detect user presence in close proximity to the image system according to:

```
if ((changed_zones > zone_threshold_2) && (changed_columns >
    column_threshold) && (no_sudden_light))
        detection = 1;
else
        detection = 0;
end
``` where zone_threshold_2 can correspond to a pre-determined threshold (e.g., a second zone threshold) associated with a minimum number of changed zones for an electronic device operating in a power saving mode (e.g., zone_threshold_2 can have a value of 5 for a 4×4 grid of zones), and column_threshold can correspond to a pre-determined threshold associated with a minimum number of changed columns for an electronic device operating in a power saving mode (e.g., column_threshold can have a value of 2 for a 4×4 grid of zones).

Thus, if, at step 410, the control circuitry determines that at least one parameter of the set of parameters does not satisfy a pre-determined threshold (e.g., zone_threshold_1, zone_threshold_2, column_threshold, and/or no_sudden_light), process 400 may return to step 406. At step 406, the control circuitry can continue to detect user presence for a subsequent image frame. For example, the control circuitry can select a next image frame as the current frame, where the next image frame is divided into a grid of zones, and each zone of the grid of zones is associated with a current luminance value.

If, at step 410, the control circuitry instead determines that at least one parameter of the set of parameters satisfies a pre-determined threshold, process 400 may move to step 412. At step 412, the control circuitry can perform one or more actions based at least in part on the at least one parameter and an operating mode of the electronic device (e.g., a normal power mode or a power saving mode).

In some embodiments, the control circuitry can switch the operating mode of the electronic device. For example, as discussed previously, if the current operating mode is the power saving mode, the control circuitry can wake up the electronic device (e.g., enable the electronic device to enter a normal power mode). For instance, the control circuitry may transmit an output parameter of the presence detection (e.g., a detection parameter) to a power management circuitry (e.g., power management circuitry 130 of FIG. 1) of the electronic device. The control circuitry can, for instance, adjust a signal state of a control line (e.g., bus 140 of FIG. 1) to the power management circuitry based on the value of the output parameter. For example, if the detection parameter has a value of 1, the control circuitry can adjust the signal state from a high state to a low state, and can subsequently trigger the power management circuitry to wake up the electronic device (e.g., wake up a processor such as processor 138 of FIG. 1).

As another example, if the current operating mode is the normal power mode, the control circuitry can enable the electronic device to enter a power saving mode. For instance, the control circuitry may transmit an output parameter of the presence detection (e.g., a detection parameter) to the power management circuitry of the electronic device. The control circuitry can, for instance, adjust a signal state of a control line to the power management circuitry based on the value of the output parameter. For example, if the detection parameter has a value of 0, the control circuitry can adjust the signal state from a low state to a high state. By adjusting the signal state, the control circuitry can trigger the power management circuitry to transmit information to a processor (e.g., processor 138 of FIG. 1) for the electronic device to enter a power saving mode.

As discussed previously, in either the power saving mode or the normal power mode, the control circuitry can also enable other actions in the electronic device (e.g., by working with the power management circuitry) such as, for example, shortening the duration that the electronic device will wait prior to entering the power saving mode, dimming a display (e.g., display 134 of FIG. 1), triggering a detection module (e.g., detection module 132 of FIG. 1) to verify whether a user is in front of the electronic device, any other suitable actions, and/or any combination thereof. For instance, instead of waiting for 20 minutes before entering the power saving mode, the electronic device may immediately enter the power saving mode if no detection parameter has been received for a pre-determined period of time (e.g., 5 minutes). Alternatively, in response to not having received a detection parameter for the pre-determined period of time, the electronic device may dim the display (e.g., by decreasing the brightness by 10%) for 15 seconds prior to entering the power saving mode. After performing the one or more actions, process 400 may end at step 414.

Figure 5A:
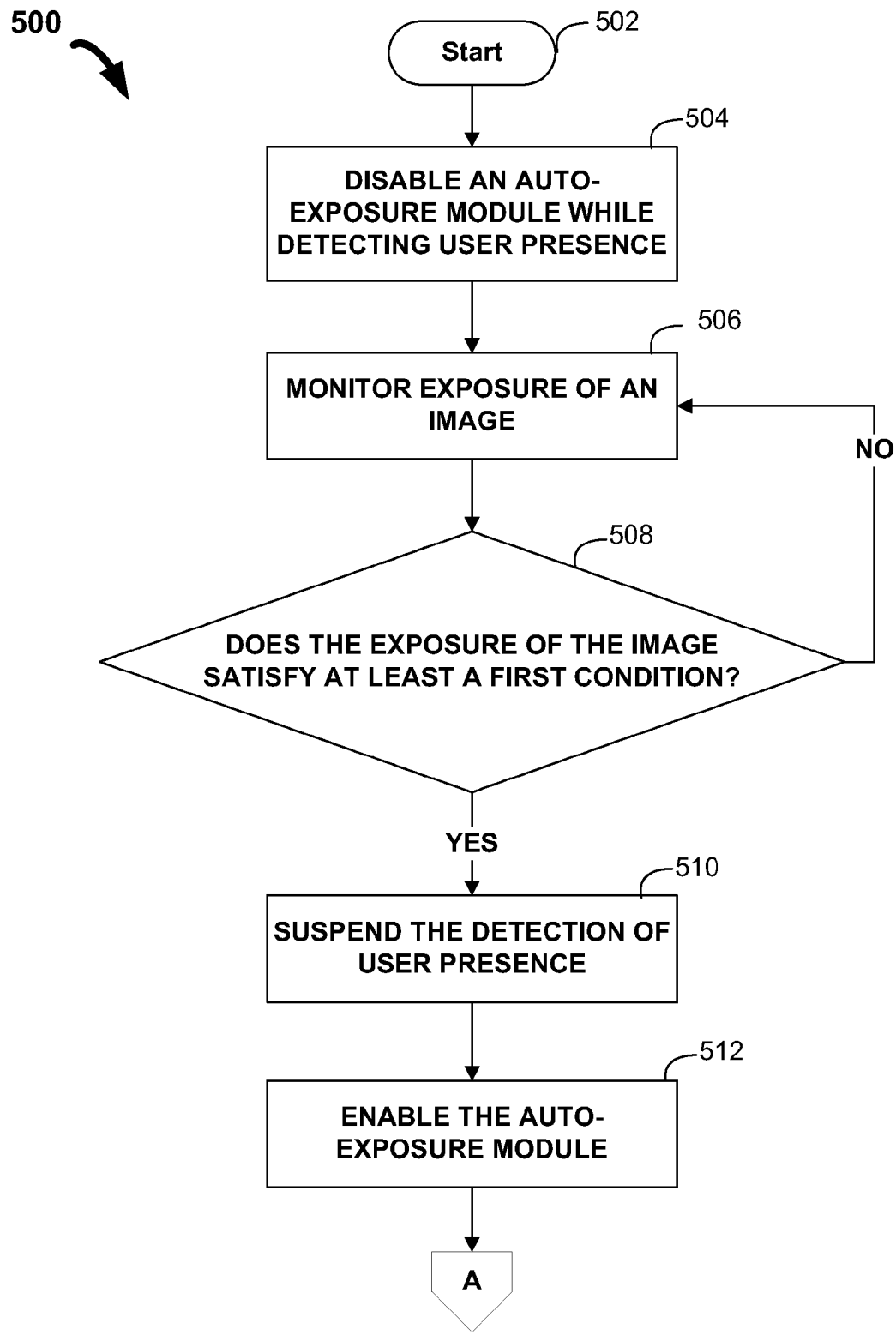
FIGS. 5A and 5B are flowcharts of an illustrative process for adjusting the exposure of an image in accordance with embodiments of the invention.
Figure 5B:
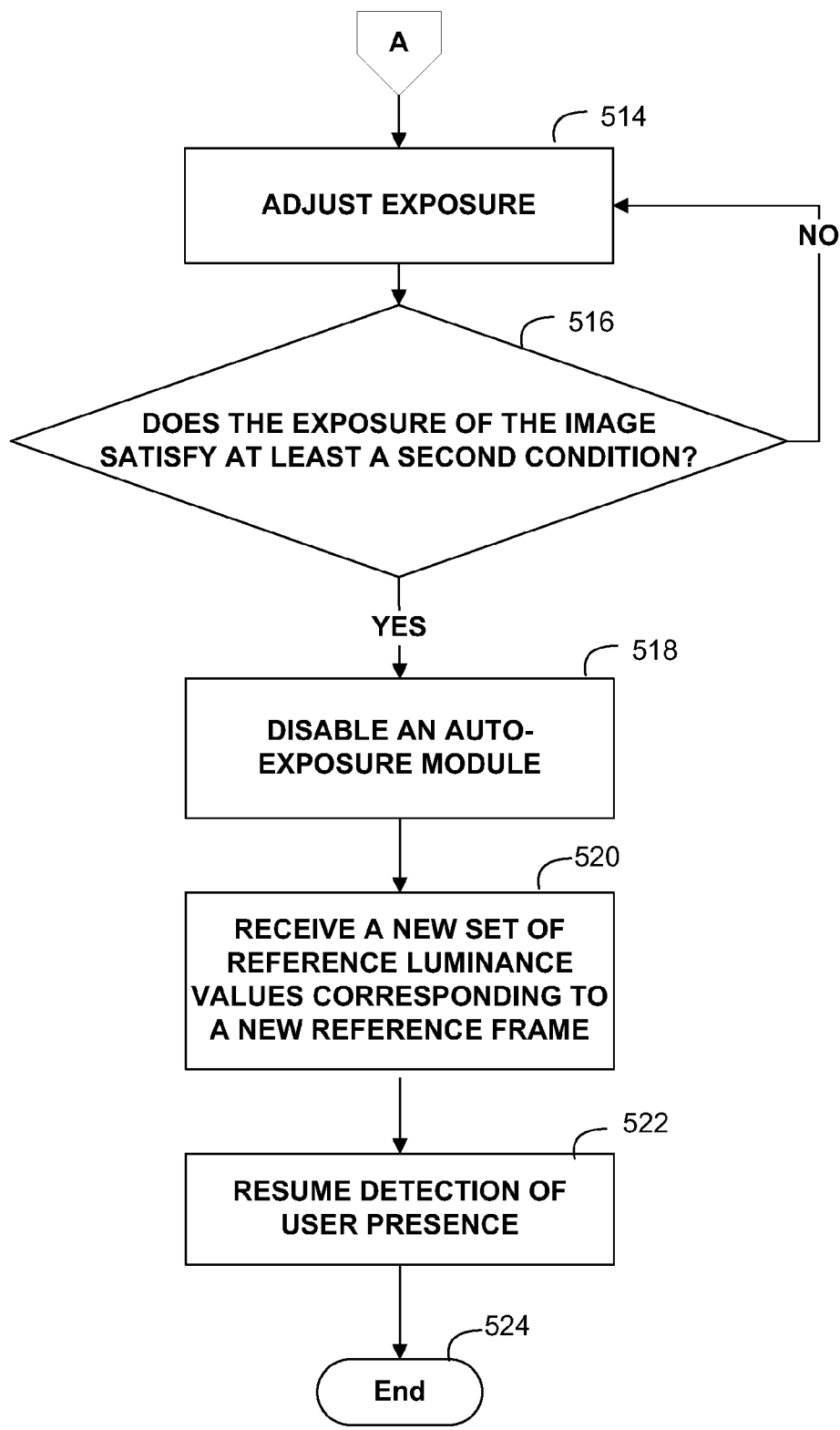

Turning now to FIGS. 5A and 5B, process 500 is shown for adjusting the exposure of an image in accordance with embodiments of the invention. Process 500 may begin at step 502. Then, at step 504, control circuitry (e.g., control circuitry 120 of FIG. 1) can disable an auto-exposure module (e.g., auto-exposure module 154 of FIG. 1) of an image system (e.g., image system 110 of FIG. 1) while detecting user presence. The control circuitry may disable the auto-exposure module, for example, because the auto-exposure module may interfere with presence detection in the image system. For instance, if the auto-exposure module adjusts the exposure of an image (e.g., a current image) while the control circuitry is performing presence detection, the luminance values of one or more zones of the image may change. The change in the luminance values may cause the control circuitry to falsely detect user presence. Therefore, in order to prevent false presence detection, the control circuitry can disable the auto-exposure module when presence detection is enabled.

Continuing to step 506, the control circuitry can begin to monitor the exposure of an image. At step 508, the control circuitry can determine if the exposure of the image satisfies at least a first condition. For example, with the auto-exposure module disabled, the lighting conditions may change (e.g., when a light switched is turned on or off). The sudden change in lighting conditions may cause the brightness of the image to reach a level such that the control circuitry can no longer effectively perform presence detection (e.g., the brightness of the image is either too dark or too bright).

Thus, in some embodiments, the control circuitry can detect if one or more luminance values of the image (e.g., an average luminance value of the entire image) falls below or exceeds one or more luminance thresholds. For example, the control circuitry can detect if the average luminance value falls below a low luminance threshold (e.g., when the image has become too dark) or exceeds a high luminance threshold (e.g., when the image has become too bright). In other embodiments, the control circuitry can determine if the required exposure adjustment is greater than an exposure threshold (e.g., 1 stop).

If, at step 508, the control circuitry determines that the exposure of the image does not satisfy at least a first condition, process 500 may return to step 506. At step 506, the control circuitry can continue to perform presence detection and monitor the exposure of an image.

On the other hand, if at step 508, the control circuitry instead determines that the exposure of the image satisfies at least a first condition, process 500 may move to step 510. At step 510, the control circuitry can suspend the detection of user presence.

Then, at step 512, the control circuitry can enable the auto-exposure module. Thus, at step 514, the auto-exposure module can adjust the exposure of the image (e.g., based on the change in luminance values).

Continuing to step 516, the control circuitry can determine if the exposure of the image satisfies at least a second condition. For example, after one or more frames, the auto-exposure module may have adjusted the exposure of the image to a reasonable level. In some embodiments, in order to determine if the exposure of the image satisfies at least a second condition, the control circuitry can detect if one or more luminance values of the image (e.g., an average luminance value for the entire image) falls between one or more luminance thresholds. For example, the control circuitry can detect if the average luminance value is between a low luminance threshold and a high luminance threshold. In other embodiments, the control circuitry can determine if the required exposure adjustment is lower than an exposure threshold (e.g., ¼ of a stop).

If, at step 516, the control circuitry determines that the exposure of the image does not satisfy at least a second condition, process 500 may return to step 514, where the auto-exposure module can continue to adjust the exposure of the image.

However, if, at step 516, the control circuitry instead determines that the exposure of the image satisfies at least a second condition, process 500 may move to step 518. At step 518, the control circuitry can disable the auto-exposure module.

Then, at step 520, the control circuitry can receive a new set of reference luminance values corresponding to a new reference frame. After receiving a new set of reference luminance values, the control circuitry can update the reference frame. The new set of reference luminance values may be necessary because the old reference luminance values may no longer be valid due to the exposure adjustment. In some embodiments, the control circuitry can store the new set of reference luminance values in memory (e.g., memory 152 of FIG. 1).

At step 522, the control circuitry can resume the detection of user presence. Process 500 may then end at step 524.

Figure 6:
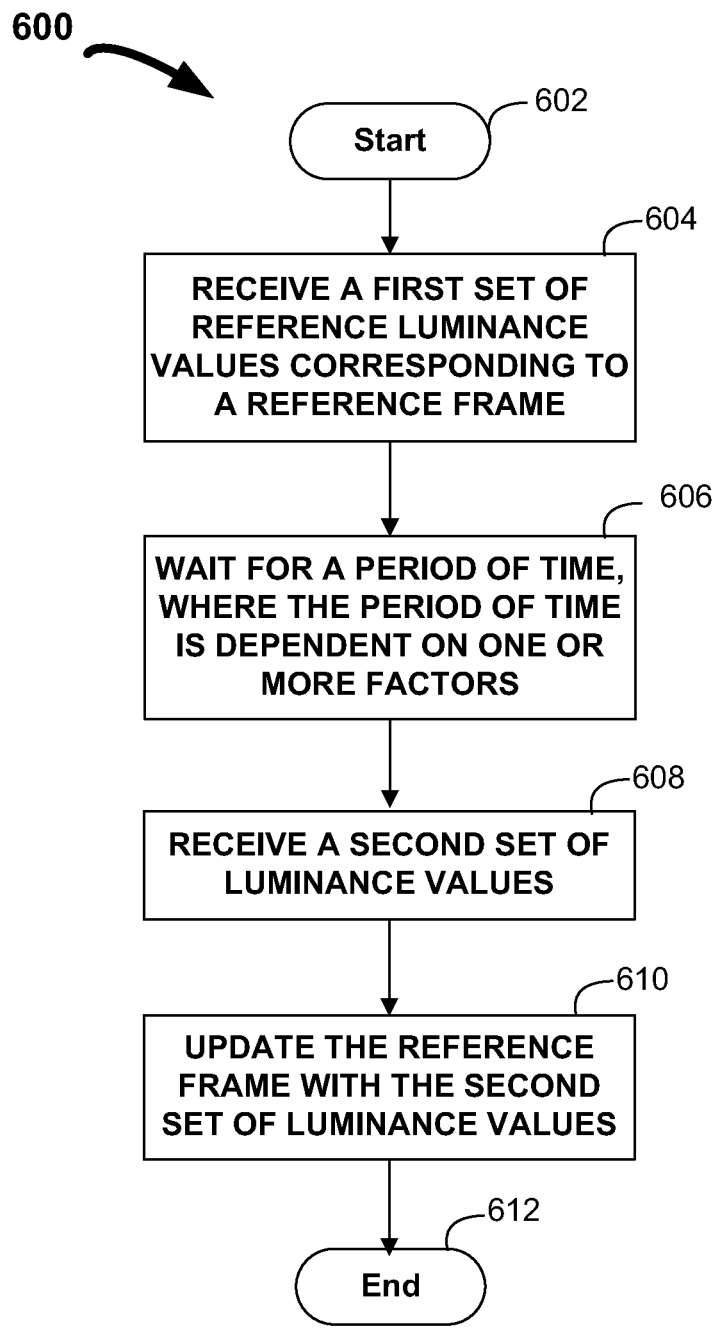
FIG. 6 is a flowchart of an illustrative process for updating a reference frame in accordance with embodiments of the invention.

Turning now to FIG. 6, process 600 is shown for updating a reference frame in accordance with embodiments of the invention. Process 600 starts at step 602, where presence detection of an image system (e.g., image system 110 of FIG. 1) has been enabled. Then, at step 604, control circuitry (e.g., control circuitry 120 of FIG. 1) can receive a first set of reference luminance values corresponding to a reference frame.

Continuing to step 606, the control circuitry can wait for a period of time, where the period of time can be dependent on one or more factors. The one or more factors can include, for example, a time of day, a pre-determined number of frames, the values of one or more parameters, a current mode of operation, any other suitable factor(s), and/or any combination thereof.

For example, depending on the time of day, gradual light changes (e.g., natural light changes caused by the sun setting or rising) may occur. The gradual light changes may eventually create substantial changes in the luminance values in one or more zones of a current frame. Without any adjustments to the system, the changes in luminance values may cause the control circuitry to detect false positives and/or false negatives (e.g., fail to detect a user when the user is actually in front of the electronic device).

In some embodiments, in order to determine the period of time for waiting, the control circuitry can maintain a time-dependent counter and monitor when the time-dependent counter reaches a pre-determined threshold (e.g., a counter threshold). For example, the time-dependent counter may be associated with the number of frames that have passed since a previous update of the reference frame. Thus, the control circuitry can continue to wait until the time-dependent counter has reached the counter threshold.

In some cases, once the control circuitry determines that the time-dependent counter has reached the counter threshold, the control circuitry can determine whether a number of changed zones parameter (e.g., a changed_zones parameter) is within a pre-determined threshold (e.g., a number of zones threshold). Thus, the control circuitry may continue to wait unless both conditions (e.g., the time-dependent counter and the number of changed zones parameter) are satisfied.

In other embodiments, the control circuitry may continue to wait until user presence has been detected (e.g., when a detection parameter has a value of 1). In further embodiments, the period of time for waiting may depend on the current mode of operation. For example, if the image system is operating in a normal power mode, the period of time can correspond to when the control circuitry detects user presence. As another example, if the image system is operating in a power saving mode, the period of time can correspond to when the control circuitry determines that an update of the reference frame is necessary.

After waiting for the period of time, process 600 may move to step 608. At step 608, the control circuitry can receive a second set of luminance values. In some embodiments, the second set of luminance values may correspond to the luminance values of a current frame.

Then, at step 610, the control circuitry can update the reference frame with the second set of luminance values. For example, the control circuitry can replace the first set of reference luminance values with the second set of luminance values. Process 600 may then end at step 612.

In conclusion, various embodiments are disclosed for presence detection using an image system. In some embodiments, an electronic device is provided that includes an image system and control circuitry. The image system can be a camera that is integrated into the electronic device.

The image system can accommodate multiple operating modes of the electronic device. For example, when the electronic device is operating in a normal power mode of operation, control circuitry of the image system can detect when a user has left and is no longer using the electronic device. In addition, when the electronic device is operating in a power saving mode of operation, the control circuitry can detect user presence (e.g., when a user has come back to the electronic device).

In order to detect user presence or the lack of user presence, the control circuitry can receive a set of reference luminance values corresponding to a reference frame. In addition, the control circuitry can receive a set of current luminance values corresponding to a current frame. Then, by calculating a set of parameters between the set of reference luminance values and the set of current luminance values, the control circuitry can determine if at least one of the parameters satisfies a pre-determined threshold.

For example, if the electronic device is operating in a normal power mode and at least one of the parameters satisfies a pre-determined threshold, the control circuitry may determine that a user has left. As a result, the control circuitry can enable the electronic device to enter a power saving mode. As another example, if the electronic device is operating in a power saving mode and at least one of the parameters satisfies a pre-determined threshold, the control circuitry may determine that a user has come back to the electronic device. As a result, the control circuitry can enable the electronic device to wake up automatically (e.g., enter a normal power mode) without any express actions from the user.

In some embodiments, in response to detecting user presence or the lack of user presence, the control circuitry can enable other actions in the electronic device. For example, in order to conserve power, the control circuitry can shorten the duration that the electronic device waits before entering the power saving mode. As another example, the control circuitry can enable the electronic device (e.g., by transmitting information to the electronic device) to dim a display. This dimming can provide a warning to a user that the electronic device will soon enter a power saving mode. As yet another example, the control circuitry can trigger a detection module to further verify whether a user is in front of the electronic device. Thus, the triggering of the detection module can prevent the electronic device from prematurely switching to a different mode of operation. In addition, by triggering the detection module, the control circuitry can enable automatic user login.

In some embodiments, in response to sudden light changes, the control circuitry can provide for automatic exposure adjustment using an auto-exposure module. In some embodiments, the control circuitry can periodically update the reference frame in order to accommodate gradual light changes.

The described embodiments of the invention are presented for the purpose of illustration and not of limitation.

What is claimed is:

1. A method of performing presence detection, the method comprising:
   selecting a first image frame as a reference frame, wherein the reference frame is divided into a first grid of zones, and wherein the first grid of zones is associated with a set of reference luminance values;
   selecting a second image frame as a current frame, wherein the current frame is divided into a second grid of zones, and wherein the second grid of zones is associated with a set of current luminance values;
   calculating a set of parameters between the set of reference luminance values and the set of current luminance values;
   determining that at least one of the set of parameters satisfies a pre-determined threshold:
   in response to the determining, performing one or more actions based at least in part of the at least one parameter and an operating mode of an electronic device;
   monitoring at least one of a number of positively changed zones, a number of negatively changed zones, a number of changed zones, and a number of changed columns;
   detecting if a sudden light change has occurred based at least in part on the number of positively changed zones, the number of negatively changed zones, and the number of changed zones; and
   in response to detecting that the sudden light change has not occurred:
     determining that an operating mode of an electronic device is a power saving mode;
     determining that a number of changed zones is above a second zone threshold;
     determining that a number of changed columns is above a column threshold; and
     detecting user presence in close proximity to the electronic device.

2. The method of claim 1, wherein the selecting the first image frame further comprises storing the set of reference luminance values.

3. The method of claim 1, wherein the calculating the set of parameters comprises calculating an absolute differential between the set of current luminance values and the set of reference luminance values.

4. The method of claim 1, wherein the calculating the set of parameters comprises calculating a percentage differential between the set of current luminance values and the set of reference luminance values.

5. The method of claim 1, further comprising switching the operating mode, wherein the switching the operating mode comprises enabling the electronic device to enter a normal power mode.

6. The method of claim 5, wherein the enabling the electronic device comprises:
   adjusting a signal state of a control line to a power management circuitry of the electronic device; and
   triggering the power management circuitry to wake up the electronic device.

7. The method of claim 1, further comprising:
   determining that a time-dependent counter has reached a counter threshold;
   determining that a number of changed zones is within a number of zones threshold; and
   selecting a third image frame as the reference frame.

8. An image system comprising:
   an image sensor operative to calculate a set of luminance values;
   an auto-exposure module for adjusting exposure of an image; and
   control circuitry for performing presence detection, wherein the control circuitry is operative to:
     disable the auto-exposure module while detecting user presence;

receive, from the image sensor, a set of reference luminance values corresponding to a reference frame and a set of current luminance values corresponding to a current frame;

calculate a set of parameters between the set of reference luminance values and the set of current luminance values;

determine that at least one parameter of the set of parameters satisfies a pre-determined threshold; and in response to the determining, perform one or more actions based at least in part on the at least one parameter and an operating mode of an electronic device.

9. The image system of claim 8, wherein each luminance value of the set of reference luminance values corresponds to each zone of a plurality of zones of a reference frame, and wherein each luminance value of the set of current luminance values corresponds to each zone of a plurality of zones of a current frame.

10. The image system of claim 8, wherein the control circuitry is operative to monitor at least one of a number of positively changed zones, a number of negatively changed zones, a number of changed zones, and a number of changed columns.

11. The image system of claim 10, wherein the control circuitry is operative to detect if a sudden light change has occurred based at least in part on the number of positively changed zones, the number of negatively changed zones, and the number of changed zones.

12. The image system of claim 11, wherein the control circuitry is operative to:

determine that one of the number of positively changed zones and the number of negatively changed zones is equal to zero;

determine that the number of changed zones is above or equal to a high zone threshold; and detect that the sudden light change has occurred.

13. The image system of claim 11, wherein in response to detecting that the sudden light change has not occurred, the control circuitry is operative to:

determine that the operating mode of the electronic device is a normal power mode;

determine that the number of changed zones is greater than a first zone threshold; and detect user presence in close proximity to the image system.

14. The image system of claim 11, wherein in response to detecting that the sudden light change has not occurred, the control circuitry is further operative to:

determine that the operating mode of the electronic device is a power saving mode;

determine that the number of changed zones is above a second zone threshold;

determine that the number of changed columns is above a column threshold; and detect user presence in close proximity to the image system.

15. The image system of claim 8, wherein the control circuitry is operative to:

monitor exposure of the image;

determine if the exposure of the image satisfies at least a first condition;

in response to the determining, suspend the detection of user presence; and enable the auto-exposure module.

16. The image system of claim 15, wherein the control circuitry is operative to:

monitor an average luminance value of the image; and determine that the average luminance value falls below a low luminance threshold or exceeds a high luminance threshold.

17. The image system of claim 15, wherein the auto-exposure module is operative to adjust the exposure.

18. The image system of claim 17, wherein the control circuitry is operative to:

determine if the exposure of the image satisfies at least a second condition;

disable the auto-exposure module;

receive, from the image sensor, a new set of reference luminance values corresponding to a new reference frame; and resume the detection of user presence.

* * * * *